United States Patent
Egami et al.

(10) Patent No.: US 11,427,730 B2
(45) Date of Patent: Aug. 30, 2022

(54) DISPERSION LIQUID OF SILICA PARTICLES AND PRODUCTION METHOD THEREFOR

(71) Applicant: JGC CATALYSTS AND CHEMICALS LTD., Kanagawa (JP)

(72) Inventors: Miki Egami, Fukuoka (JP); Mitsuaki Kumazawa, Fukuoka (JP); Hirotada Arakane, Fukuoka (JP); Ryo Muraguchi, Fukuoka (JP); Toshiharu Hirai, Kanagawa (JP)

(73) Assignee: JGC CATALYSTS AND CHEMICALS LTD., Kanagawa (JP)

( * ) Notice: Subject to any disclaimer, the term of this patent is extended or adjusted under 35 U.S.C. 154(b) by 32 days.

(21) Appl. No.: 16/764,050

(22) PCT Filed: Nov. 15, 2018

(86) PCT No.: PCT/JP2018/042209
§ 371 (c)(1),
(2) Date: May 14, 2020

(87) PCT Pub. No.: WO2019/098257
PCT Pub. Date: May 23, 2019

(65) Prior Publication Data
US 2020/0392374 A1 Dec. 17, 2020

(30) Foreign Application Priority Data
Nov. 16, 2017 (JP) .............................. JP2017-221356

(51) Int. Cl.
*C09G 1/02* (2006.01)
*C09K 3/14* (2006.01)
*C01B 33/18* (2006.01)

(52) U.S. Cl.
CPC ................ *C09G 1/02* (2013.01); *C01B 33/18* (2013.01); *C09K 3/1409* (2013.01);
(Continued)

(58) Field of Classification Search
CPC .. C01B 33/18; C01P 2004/62; C01P 2004/64; C01P 2006/12; C01P 2006/22;
(Continued)

(56) References Cited

U.S. PATENT DOCUMENTS

2007/0237701 A1  10/2007  Yamakawa et al.
2010/0037801 A1  2/2010  Ohmori et al.
(Continued)

FOREIGN PATENT DOCUMENTS

JP    2005-060217 A    3/2005
JP    2005-60219 A     3/2005
(Continued)

OTHER PUBLICATIONS

ISR in PCT/JP2018/042209, dated Feb. 5, 2019.

*Primary Examiner* — Shuangyi Abu Ali
(74) *Attorney, Agent, or Firm* — Greenblum & Bernstein, P.L.C

(57) ABSTRACT

Provided is a dispersion liquid of silica particles, comprising silica particles having an average particle diameter of 5 to 300 nm determined from an electron micrograph and a density of 1.20 g/cm³ or more determined from a specific surface area determined by a BET method using nitrogen adsorption, wherein the dispersion liquid has a pH of less than 8, a silica concentration of 12 to 40% by mass, and a viscosity in terms of a silica concentration of 20% by mass of 40 mPa·s or less. When this silica particle is used as an abrasive, it is possible to realize a sufficient polishing speed and a smooth polished surface on which occurrence of scratches is suppressed.

6 Claims, 1 Drawing Sheet

(A)

(B)

(C)

(D)

(52) U.S. Cl.
CPC ...... *C01P 2004/62* (2013.01); *C01P 2004/64* (2013.01); *C01P 2006/12* (2013.01); *C01P 2006/22* (2013.01); *C01P 2006/80* (2013.01)

(58) Field of Classification Search
CPC ..... C01P 2006/80; C09G 1/02; C09K 3/1409; C09K 3/1463
See application file for complete search history.

(56) References Cited

U.S. PATENT DOCUMENTS

| | | |
|---|---|---|
| 2016/0130425 A1 | 5/2016 | Yoshitake et al. |
| 2016/0177155 A1 | 6/2016 | Nakamura et al. |
| 2016/0272846 A1 | 9/2016 | Tsuchiya et al. |

FOREIGN PATENT DOCUMENTS

| | | | |
|---|---|---|---|
| JP | 2007-153732 A | | 6/2007 |
| JP | 2012-162426 A | | 8/2012 |
| JP | 2014-198649 A | | 10/2014 |
| JP | 2014198649 A1 | * | 10/2014 |
| JP | 2015-19058 A | | 1/2015 |
| JP | 2015-74737 A | | 4/2015 |
| JP | 2017-43531 A | | 3/2017 |
| WO | WO 2008/093422 A1 | | 8/2008 |
| WO | WO 2014-148399 A1 | | 9/2014 |
| WO | WO 2014/199904 A1 | | 12/2014 |
| WO | WO 2015/012118 A1 | | 1/2015 |

* cited by examiner

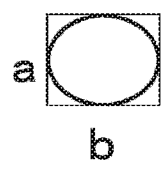
a
b
(A)
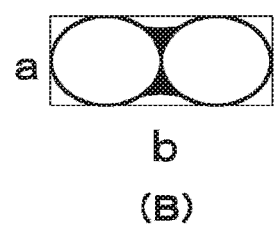
a
b
(B)
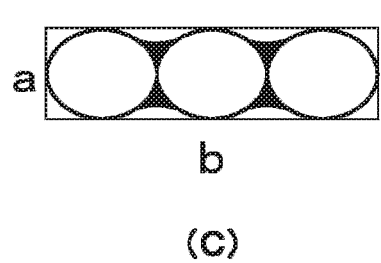
a
b
(C)
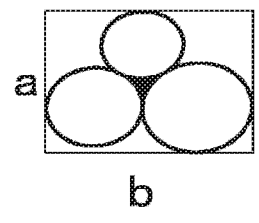
a
b
(D)

DISPERSION LIQUID OF SILICA PARTICLES AND PRODUCTION METHOD THEREFOR

TECHNICAL FIELD

The present invention relates to a dispersion liquid of silica particles and a production method therefor.

BACKGROUND ART

Dispersion liquids of silica particles used for polishing silicon wafers and the like are required to have a low content of impurities such as metal ions. For example, Patent Literatures 1 to 3 disclose dispersion liquids of silica particles with high purity obtained by hydrolyzing tetramethoxysilane and having a low content of metal impurities such as sodium. In case of obtaining a dispersion liquid of highly-pure silica particles, in general, a method is employed in which an alkoxysilane is hydrolyzed using an alkali catalyst such as ammonia, and the solvent and the by-product, an alcohol, are removed and replaced with water. However, in Patent Literature 3, since ammonia and amines have a high volatility, a neutral colloidal silica having a desired particle diameter cannot be obtained. So, quaternary ammoniums, amino alcohols, morpholines and piperazines are used as an alkali catalyst instead of them. Patent Literature 3 discloses a method for producing a colloidal silica having a high particle density through a liquid phase substitution method (pycnometer method). In addition, Patent Literature 4 discloses using a fumed silica having a particle density of 2.24 $g/cm^3$ or more measured by a He gas pycnometer method as an abrasive grain, in order to achieve both a high polishing rate and scratch suppression.

Furthermore, in order to improve the quality of silicon wafers such as smoothening of the surface and reduction of defects, a variety of techniques related to polishing compositions have been proposed in addition to abrasive grains. For example, Patent Literature 5 discloses that, by using a polishing composition containing water soluble polymers having different solubility parameters (SP values) and a dispersion liquid of abrasive grains with a pH of 8 or more containing silica particles having a true specific gravity of 1.5 or more, a polished surface having a low haze and a low number of deposited particles (Light Point Defect; LPD) can be obtained. In addition, Patent Literature 6 discloses an aqueous dispersion for chemical mechanical polishing containing abrasive grains and a phosphoric acid ester compound having an organic group with 6 or more carbon atoms. Furthermore, Patent Literature 7 discloses an aqueous dispersion for chemical mechanical polishing containing abrasive grains, a hydroxyalkyl group with 3 to 8 carbon atoms, and an oxidant. These Patent Literatures 6 and 7 disclose that the viscosity of the aqueous dispersions for chemical mechanical polishing can be adjusted by water soluble polymers.

CITATION LIST

Patent Literature

[Patent Literature 1] Japanese Patent Laid-Open Publication No. 2005-060217
[Patent Literature 2] Japanese Patent Laid-Open Publication No. 2005-060219
[Patent Literature 3] Japanese Patent Laid-Open Publication No. 2007-153732
[Patent Literature 4] Re-publication of PCT International Publication No. 2015-012118
[Patent Literature 5] Re-publication of PCT International Publication No. 2014-148399
[Patent Literature 6] Japanese Patent Laid-Open Publication No. 2015-019058
[Patent Literature 7] Japanese Patent Laid-Open Publication No. 2015-074737

SUMMARY OF INVENTION

Technical Problem

Although the dispersion liquids of silica particles obtained by the methods of Patent Literatures 1 and 2 have a high purity, since the silica particles are not sufficiently compacted and also the viscosity of the dispersion liquids of silica particles is relatively high, there is a problem that the dispersibility of the silica particles is low and the polishing performance is also insufficient. The dispersion liquid of silica particles obtained through the method of the above Patent Literature 3 has a low stability, and there is a problem that the particles settle out. For the silica particles of the above Patent Literature 4, there is a problem that, since the particle density is high and the silica particles are too hard, scratches occur on the polishing surface. For the silica particles of the above Patent Literature 5, there is a problem that the dispersion stability of the silica particles is low as a material for an abrasive unless they are made into a basic dispersion liquid of abrasive grains containing a basic compound and preferably having a pH of 8 or more. For the silica particles of the above Patent Literatures 6 and 7, there is a problem that a desired dispersion liquid of highly-pure silica particles with low viscosity cannot be obtained.

The present inventors had a knowledge that a dispersion liquid containing compacted highly-pure silica particles in a high concentration can be prepared. However, in this dispersion liquid, the particles are likely to be aggregated and the viscosity is high (non-Newtonian), and it was not possible to obtain a dispersion liquid with a low viscosity having the particles unaggregated (Newtonian). When the contents of metal elements (impurities) are smaller, that is, when a dispersion liquid contains silica particles with high purity and in a higher concentration, the particles are likely to be aggregated.

As such, it was difficult to obtain a dispersion liquid of silica particles with a low viscosity, excellent in polishing performance and stability, (1) containing moderately compacted highly-pure silica particles (2) in a high concentration and (3) having the particles unaggregated.

Solution to Problem

As a result of search in order to solve the above-mentioned problems, a dispersion liquid of silica particles comprising silica particles having an average particle diameter of 5 to 300 nm determined from an electron micrograph and a density of 1.20 g/cm3 or more determined from the average particle diameter and a specific surface area determined by a BET method using nitrogen adsorption, wherein the dispersion liquid has a pH of less than 8, a silica concentration of 12 to 40% by mass, and a viscosity in terms of a silica concentration of 20% by mass of 40 mPa·s or less, was found.

Also, the production method of the present invention comprises a dispersion liquid preparation step of preparing a dispersion liquid containing silica particles by using an alkoxysilane as a raw material; an aging step of heating the dispersion liquid in the presence of alkali such that a density of the silica particles determined from an average particle diameter determined from an electron micrograph and a specific surface area determined by a BET method using nitrogen adsorption is 1.20 g/cm$^3$ or more; and an alkali removal step of removing the alkali from the dispersion liquid obtained in the aging step to once raise a viscosity in terms of a silica concentration of 20% by mass of the dispersion liquid to 60 mPa·s or more and then further removing the alkali to provide a pH of the dispersion liquid of less than 8.

In addition, the production method of the present invention seen from another viewpoint is a method for producing a dispersion liquid of silica particles, the method, comprising a dispersion liquid preparation step of preparing a dispersion liquid of silica particles by using an alkoxysilane as a raw material; an aging step of heating this dispersion liquid of silica particles in the presence of alkali to age the silica particles; and an alkali removal step of removing the alkali from this dispersion liquid of aged silica particles; to produce a dispersion liquid containing silica particles having a density of 1.20 g/cm$^3$ or more, a silica concentration of 12% by mass or more, and a viscosity in terms of a silica concentration of 20% by mass of 40 mPa·s or less.

In a dispersion liquid of silica particles prepared on the alkali side, when the pH becomes lower than 9, the silica particles slowly begin to be aggregated along with the decrease in the pH and the viscosity is gradually raised (this tendency is more remarkable when the silica particles do not contain a lot of metal impurities and the purity thereof is higher). Furthermore, when the pH decreases to a predetermined pH, the viscosity raises drastically. However, after raising the viscosity sufficiently, and further decreasing the pH is below this pH, surprisingly, the viscosity drops sharply and a Newtonian dispersion liquid of silica particles with a low viscosity is obtained. Moreover, the silica particles contained in the dispersion liquid are sufficiently compacted particles.

Advantageous Effects of Invention

According to the present invention, a dispersion liquid of silica particles with a low viscosity, (1) containing compacted highly-pure silica particles (2) in a high concentration and (3) having the particles unaggregated can be provided. When this dispersion liquid of silica particles is used as an abrasive (polishing composition), a sufficient polishing speed can be obtained. In particular, in the case of using a moderately compacted highly-pure silica, in addition to the polishing speed, a smooth polished surface can be obtained.

BRIEF DESCRIPTION OF DRAWING

FIGS. 1(A) to (D) illustrate a method for calculating the aspect ratio of silica particles.

DESCRIPTION OF EMBODIMENTS

The dispersion liquid of silica particles according to the present invention comprises silica particles having an average particle diameter of 5 to 300 nm and a density of 1.20 g/cm$^3$ or more, and has a pH of less than 8, a silica concentration of 12 to 40% by mass, and a viscosity of 40 mPa·s or less.

When the average particle diameter is less than 5 nm, the stability of the dispersion liquid becomes insufficient. In addition, since the particle diameter is too small, a sufficient polishing speed cannot be obtained when used as an abrasive. On the contrary, when the average particle diameter is greater than 300 nm, cracks (scratches) are likely to occur and a sufficient smoothness cannot be obtained. The average particle diameter is preferably 5 to 100 nm.

Particles having a density of less than 1.20 g/cm$^3$ are porous and fragile. As such, when they are used as an abrasive, a desired polishing speed cannot be obtained. The density is preferably 1.25 g/cm$^3$ or more, more preferably 1.30 g/cm$^3$ or more, and further preferably 1.40 g/cm$^3$ or more.

It is to be noted that, when particles having a density of 1.60 g/cm$^3$ or more (that is, more compacted particles) are used as an abrasive, although the polishing speed is fast, since the particles are compact and hard, depending on the usage, cracks (scratches) may occur on the polished surface and a smooth polished surface may not be obtained. As such, in order to obtain a sufficient polishing speed and smoothness, it is preferable to use silica particles that are not too hard as an abrasive grain for polishing and is moderately compacted. The density is preferably less than 1.60 g/cm$^3$, more preferably less than 1.55 g/cm$^3$, and further preferably less than 1.50 g/cm$^3$.

The density ρ [g/cm$^3$] of silica particles is calculated from the average particle diameter d and the specific surface area as follows.

Here, the average particle diameter of the silica particles was determined from an electron micrograph. That is, an electron micrograph of silica particles is taken, the area for each of 100 arbitrary particles is determined, and the equivalent circle diameter is determined from that area. The average value of these equivalent circle diameters is defined as the average particle diameter d of the silica particles. The specific surface area is determined by a BET method using nitrogen adsorption. Specifically, the specific surface area was measured by using Macsorb-1200 manufactured by Mountech Co., Ltd. As a sample for measurement, the dispersion liquid was dried at 105° C. to be used in form of powder.

The surface area per particle (S [nm$^2$/particle]) is expressed as $4\pi(d/2)^2$, that is, $\pi d^2$. In addition, the volume per particle (V [nm$^3$/particle]) is expressed as $(4/3)\pi(d/2)^3$, that is, $(\pi d^3)/6$.

The specific surface area SA is expressed as follows:

Specific surface area SA [m$^2$/g]=1000·S/(ρV)=(1000/ρ)·(6/d)=6000/(ρd)

and thus, the density of the silica particles is expressed as follows:

Density of silica particles ρ [g/cm$^3$]=6000/(SA·d).

The pH of the dispersion liquid is less than 8. When the pH is in this range, upon processing into an abrasive, the dispersion liquid is in a state with a low viscosity (Newtonian liquid) and handling is thus easy. This pH is preferably 7.6 or less, more preferably less than 7.4, further preferably less than 7.0, and particularly preferably 6.7 or less. The lower limit thereof is preferably 6.0. Even when the pH is less than 6.0, the viscosity of the dispersion liquid does not drop dramatically.

The silica concentration of the dispersion liquid is 12% by mass or more. The upper limit of this concentration is not particularly limited, and is, for example, 40% by mass. The lower limit thereof is preferably 15% by mass or more, and more preferably 20% by mass or more.

The dispersion liquid has a viscosity in terms of a silica concentration of 20% by mass of 40 mPa·s or less. In general, the higher the purity is and/or the higher the concentration is, the higher the viscosity of the dispersion liquid becomes. However, despite its high purity, this dispersion liquid has a low viscosity even at a high concentration of 20% by mass and exhibits Newtonian properties. When the viscosity is low, the silica particles are readily dispersed even when the dispersion liquid is used to prepare an abrasive. In addition, in general, when the concentration is lowered, the viscosity is also lowered, but since this dispersion liquid has a high concentration, the transportation cost can be suppressed, as well. Furthermore, this dispersion liquid contains almost no incompletely reacted materials and contains sufficiently compact silica particles. As such, the dispersion liquid is suitably used for polishing silicon wafers and the like. The viscosity of the dispersion liquid is preferably 35 mPa·s or less, more preferably 30 mPa·s or less, and further preferably 20 mPa·s or less.

It is preferable that the amounts of the following elements in the dispersion liquid of silica particles be, per silica particle, in the following ranges:

(1) the amount of each of alkali metals, alkali earth metals, Fe, Ti, Zn, Pd, Ag, Mn, Co, Mo, Sn, Al and Zr is less than 0.1 ppm;

(2) the amount of each of Cu, Ni and Cr is less than 1 ppb; and (3) the amount of each of U and Th is less than 0.3 ppb.

Note that these metal elements are impurities and it is preferable that they are contained as less as possible in the dispersion liquid.

In the case of an abrasive using a dispersion liquid containing these elements in larger amounts compared to the above ranges, the elements may remain on the substrate. Then, these elements cause insulation failure of the circuit formed on the substrate or short the circuit, thereby raising the dielectric constant of the film (insulating film) provided for insulation. Thus, the impedance of the metal wiring may be increased, leading to lowering of the responsivity, increase of the power consumption, and so on. In addition, ions of these elements may migrate (diffuse), and failures as mentioned above may occur under severe working conditions or after long-term use. In particular, U and Th generate radiation, and therefore, even when the amount of remaining U or Th is minute, malfunctions of the semiconductor is caused. Note that the alkali metals refer to each element of Li, Na, K, Rb, Cs and Fr. The alkali earth metals refer to each element of Be, Mg, Ca, Sr, Ba and Ra.

It is more preferable that the amount of a "compound containing silicon" other than the silica particles present in the dispersion liquid is as small as possible. When an abrasive using a dispersion liquid in which this "compound containing silicon" is contained at 200 ppm or less is used, deposits on substrate can be suppressed. In addition, it is suppressed that a variety of chemicals added to an abrasive are adsorbed onto or allowed to react with the "compound containing silicon", and thus, the effects of a variety of chemicals can be exhibited.

Note that the "compound containing silicon" includes those whose reaction has not progressed to the silica particles intended to be produced, and examples thereof include an unreacted raw material alkoxysilane and its hydrolyzates having a low molecular weight (oligomers).

It is preferable that the silica particles contain 0.005% by mass or more and less than 0.50% by mass of carbon derived from an alkoxy group. When the carbon content is in this range, by using an abrasive using this dispersion liquid, it is possible to obtain a substrate with less deposition of particles and from which the particles are easily washed away (with less "remaining" of the silica component).

Although this mechanism has not been specified, it is presumed that the reason why a large amount of the silica component "remains" on the substrate conventionally is because excessive alkoxy residues of the silica particles are hydrolyzed by the addition of an acid or alkali upon preparing an abrasive, thereby generating a lot of active OH groups. On the other hand, when the carbon content in the silica particles is in the above range, it is believed that the amount of active OH groups generated through hydrolysis of alkoxy residues is very small at the stage of preparing an abrasive, thereby reducing interaction with the substrate, and a substrate with a small amount of particles deposited (with less "remaining" of the silica component) is obtained.

In addition, when the carbon content is 0.50% by mass or more, there are many alkoxy residues and many uncrosslinked parts inside the particles. As a result, a sufficient polishing speed cannot be obtained, and more particles are deposited after polishing. On the other hand, if the carbon content is less than 0.005% by mass, since there are few alkoxy residues and the siloxane bond is in progress, the particle density becomes high and the particles become very hard. As such, although the polishing speed is fast, the particles are too hard, and there is a risk of occurrence of scratches even when other conditions are adjusted. In addition, since the mixing stability between the dispersion liquid and other materials becomes low, there is a risk that aggregation is caused upon preparing an abrasive and scratches occur upon polishing. This carbon content is more preferably 0.01% by mass or more and less than 0.30% by mass, and further preferably 0.01% by mass or more and less than 0.20% by mass.

Furthermore, it is preferable that "an alkali not containing metal elements" such as ammonia and amine, is present in the dispersion liquid. The content thereof at a silica concentration of 20% by mass is preferably less than 100 ppm. When the content is in this range, in case of using the dispersion liquid as an abrasive, polishing performance such as smoothness of the substrate is improved. The reason for this has not been clarified, but it is believed that, when a load is applied to the silica particles upon the polishing, an alkali not containing metal elements, such as ammonia or amine, adsorbed inside or onto the surface of the particles comes into contact with the substrate and the substrate becomes partially alkaline, making it easier to be polished.

Here, the content is higher than this range, there is a risk that the pH and/or the viscosity of the dispersion liquid become higher and the dispersion stability is lowered.

It is to be noted that, in an abrasive, an additive other than silica particles is contained. For example, when a water soluble polymer such as hydroxyethyl cellulose is used as an additive, this additive interacts with the OH groups on the surface of silica particles, and the silica particles are aggregated. As a result, the diameter of the silica particles as an abrasive grain becomes larger, and an effect that the polishing rate becomes higher is obtained. As such, when the content is higher than the above range, the amount of an alkali adsorbed inside or onto the surface of the particles, such as ammonia and amine, is increased too much. Therefore, upon processing into an abrasive, depending on the type of organic group of the alkali, there is a risk that organic group may cover the OH groups on the surface of the particles, making it difficult for the interaction between the particles and the additive to occur. In addition, the excessive alkali may etch the polished surface.

The lower limit of the content of these compounds is not particularly limited as long as the polishing effect as mentioned above is obtained, but from the viewpoints of the relationship between viscosity and pH in the alkali removal step mentioned above and of production cost, for example, it is about 10 ppm. When the content is reduced below this, it would be an excessive treatment and the polishing effect as mentioned above may not be expected.

Among the alkali not containing metal elements, ammonia, in particular, is easy to control and adjust the pH thereof or the like upon producing a dispersion liquid of silica particles, and its residual amount can also be readily adjusted. In addition, since ammonia does not have organic groups, it sufficiently interacts with an additive when used for an abrasive. Furthermore, upon polishing, ammonia not only has the polishing effect as mentioned above, but also has a characteristic by which it is easy to be cleaned and is unlikely to remain on the substrate surface, which is particularly preferable.

Note that a variety of additives such as dispersing agents including surfactants or pH modifiers (acid or alkali) can be added to the dispersion liquid of silica particles eventually obtained.

The shape of the silica particles may be either spherical with an aspect ratio of 1.00 to 1.20 or irregular with an aspect ratio greater than 1.20 and 5.00 or less. These irregular-shaped particles have a convex portion on the surface of the particle, and therefore, stress is concentrated there upon polishing and the polishing speed for the substrate can be improved.

Silicon atoms in the silica particles are, in the $^{29}$Si-NMR analysis, classified into five types, Q0, Q1, Q2, Q3 and Q4, according to the number of oxygen-sharing silicons around the silicon atom. Specifically, in the $^{29}$Si-NMR analysis, the chemical shift of the Q0 structure appears from −73.0 to −73.5 ppm, the chemical shift of the Q1 structure from −73.5 to −78.0 ppm, the chemical shift of the Q2 structure from −78.0 to −82.0 ppm, the chemical shift of the Q3 structure from −82.0 to −100.0 ppm, and the chemical shift of the Q4 structure from −100.0 to −120.0 ppm, respectively.

In the silica particles, it is preferable that the Q4 structure determined by the $^{29}$Si-NMR analysis (that is, the area of the peak wherein the chemical shift appears from −100.0 to −120.0 ppm) is present at 70% or more based on the Q0 to Q4 structures (that is, the area of the peak wherein the chemical shift appears from −73.0 to −120.0 ppm).

Here, when the ratio (area ratio) of the Q4 structure is in this range, there are fewer unstable OH groups and the proportion of silicon-to-silicon bonds is increased, resulting in silica particles having a large particle density, as well as a high compactness and stability. As such, when it is used as an abrasive, the polishing speed can be improved.

When the proportion of the Q0 to Q2 structures is high, the number of OH groups in these structures is larger (less siloxane bonds) than that in the Q3 structure and the Q4 structure. Thus, when used as an abrasive, there is a risk that a desired polishing speed cannot be obtained. For this reason, the abundance ratio of the Q0 to Q2 structures to the Q0 to Q4 structures is, with respect to the total of the Q0 to Q2 structures, preferably less than 10%, and more preferably less than 5%. Note that the abundance ratio of the Q3 structure is the remainder excluding the Q4 structure and the Q0 to Q2 structures. The abundance ratio of this Q4 structure is preferably 75% or more, and further preferably 78% or more.

It is to be noted that, when the particle density of the silica particles is too high, the following problem may occur depending on the usage: scratches may be generated and a smooth polishing surface may not be obtained. For this reason, although the upper limit of the abundance ratio of the Q4 structure is not particularly limited as long as it does not exceed the above range of particle density, for example, it is preferably 90%.

Structural analysis of the silica particles by $^{29}$Si-NMR is carried out as follows, for example.

The dispersion liquid is placed in a specialized zirconia sample tube and measured by a single pulse non-decoupling method without rotating the sample, and using a 6 mm diameter solid sample tube probe of an NMR system (Agilent VNMRS-600). Polydimethylsiloxane is used as a secondary standard and the chemical shift is set at −34.44 ppm. The obtained spectra are subjected to waveform separation with an analytical software Origin, and the area of each peak is calculated. Here, the peak area of the Q0 structure with a chemical shift of −73.0 to −73.5 ppm is defined as $S_0$, the peak area of the Q1 structure with a chemical shift of −73.5 to −78.0 ppm is defined as $S_1$, the peak area of the Q2 structure with a chemical shift of −78.0 to −82.0 ppm is defined as $S_2$, the peak area of the Q3 structure with a chemical shift of −82.0 to −100.0 ppm is defined as $S_3$, and the peak area of the Q4 structure with a chemical shift of −100.0 to −120.0 ppm is defined as $S_4$. The ratio of each structure is calculated from the area ratio of the peak of each structure $(S_i/S_T) \times 100$ [%] (with the proviso that i is a number selected from 0, 1, 2, 3 and 4, and $S_T$ is the sum of the peak area of each structure, represented by $S_T = S_0 + S_1 + S_2 + S_3 + S_4$).

As mentioned above, the dispersion liquid of silica particles according to the present invention contains compacted highly-pure silica particles in a high concentration, and has sufficient stability in spite of its near-neutral pH. The reason for this has not been clearly clarified, but it is believed that this is because the silica particles contained in this dispersion liquid are not much aggregated and the viscosity of the dispersion liquid is also low. For this reason, an abrasive using this dispersion liquid also has a sufficient stability.

[Method for Producing Dispersion Liquid of Silica Particles]

Next, a method for producing a dispersion liquid of silica particles will be described. At first, a dispersion liquid containing silica particles is prepared by using an alkoxysilane as a raw material (dispersion liquid preparation step). This dispersion liquid is heated in the presence of alkali such that the density of the silica particles becomes 1.20 g/cm$^3$ or more (aging step). Subsequently, the alkali is removed from this dispersion liquid to once raise the viscosity of the dispersion liquid to 60 mPa·s or more, and then the alkali is further removed to provide a pH of the dispersion liquid of less than 3 (alkali removal step).

By aging the silica particles while sufficiently removing alkali of the dispersion liquid, a dispersion liquid of silica particles with a low viscosity, containing compacted highly-pure silica particles in a high concentration and wherein the particles are unaggregated can be achieved. In addition, besides the steps mentioned above, a concentration step, water replacement step and the like may also be comprised. Note that, unless otherwise noted, the pH is a value at 25° C.

In the following, each of the above steps will be described in detail.

In the dispersion liquid preparation step, a dispersion liquid containing silica particles formed by hydrolyzing alkoxysilane, which is a raw material, is prepared. The hydrolysis of alkoxysilane is carried out in the presence of water, an organic solvent and a catalyst. The silica concentration of the dispersion liquid is preferably less than 10% by mass, more preferably less than 8% by mass, and further preferably less than 5% by mass. Here, the alkoxysilane may be one kind or two or more kinds. In addition, those having a short alkyl chain, such as tetramethoxysilane (TMOS) and tetraethoxysilane (TEOS), are preferable. This is because the hydrolysis rate is fast and compaction proceeds easily, silica particles having a low carbon content tend to be obtained.

Examples of the method for preparing a dispersion liquid of silica particles through hydrolysis of alkoxysilane include the following two methods:
(Method I) a method in which a mixed solution of an alkoxysilane and an organic solvent is added to a bedding solution containing water, an organic solvent and a catalyst; and
(Method II) a method in which a liquid A containing alkoxysilane and a liquid B containing a catalyst and water are added at the same time to a bedding solution consisting substantially of an organic solvent. The liquid A may contain an organic solvent. The expression "consist(ing) substantially of an organic solvent" means that the inevitably contained impurities or the like derived from the process of producing the organic solvent may be contained but other impurities or the like are not contained. For example, the organic solvent is 99% by mass or more. It is more preferably 99.5% by mass or more. The liquid A and the liquid B are added to such a bedding solution at the same time. As such, the generation of incompletely reacted materials such as oligomers that have not been grown into the silica particles intended to be produced is suppressed. In particular, by keeping the amounts of water and alkali catalyst, which have a great influence on the hydrolysis of alkoxysilane, to be constant relative to the alkoxysilane during the reaction period, the alkoxysilane sequentially added is always hydrolyzed under the same conditions. This suppresses the generation of incompletely reacted materials. That is, it is preferable that the variation rate of the mole ratio of the alkali catalyst to the alkoxysilane in the reaction system during a period from the start to the end of the addition of the liquid A and the liquid B relative to the initial mole ratio is set to 0.90 to 1.10, and that the variation rate of the mole ratio of water to the alkoxysilane in the reaction system during a period from the start to the end of the addition of the liquid A and the liquid B relative to the initial mole ratio is set to 0.90 to 1.10.

Note that, in both methods, the so-called seeding method, in which pre-prepared seed particles are added to the bedding solution, may also be employed.

Examples of the organic solvent include alcohols, ketones, ethers and esters. More specifically, alcohols such as methanol, ethanol, propanol or butanol; ketones such as methyl ethyl ketone or methyl isobutyl ketone; glycol ethers such as methyl cellosolve, ethyl cellosolve or propylene glycol monopropyl ether; glycols such as ethylene glycol, propylene glycol or hexylene glycol; or esters such as methyl acetate, ethyl acetate, methyl lactate or ethyl lactate is used. Among them, methanol or ethanol is more preferable, and methanol is particularly preferable. These organic solvents may be used alone or as a mixture of two or more.

As for the catalyst, a compound (alkali) that exhibits basic properties, such as ammonia, an amine, an alkali metal hydride, an alkali earth metal hydride, an alkali metal hydroxide, an alkali earth metal hydroxide, a quaternary ammonium compound and an amine based coupling agent can be used. These catalysts can be used alone or in combination. Ammonia is particularly preferable although it depends on the conditions for use and the amount to be used.

This is because ammonia does not contain any organic groups in its structure, and therefore, the OH groups on the surface of the particles are not covered with organic groups and the interaction between the particle and the additive is not prevented as stated in the above. In addition, ammonia is easy to handle upon production, and excess ammonia can be readily discharged out of the system by heating or the like. As such, it is easy to adjust the amount of ammonia remaining in the dispersion liquid.

The amount of the catalyst used for hydrolysis is preferably 0.005 to 1 mole per mole of alkoxysilane. Here, when the amount is less than 0.005 moles, hydrolysis is unlikely to occur and there is a risk that the particle size distribution of the particles becomes wider. On the other hand, when the amount is greater than 1 mole, the hydrolysis speed becomes significantly fast, thereby making it difficult to form particles and there is a risk that the alkoxysilane becomes a gel-like substance. It is more preferable to add 0.01 to 0.8 moles of this catalyst per mole of alkoxysilane.

The amount of water used for hydrolysis is preferably 0.5 to 10 moles per mole of Si—OR group constituting the alkoxysilane, and more preferably 1 to 5 moles.

Hydrolysis of alkoxysilane is typically carried out under atmospheric pressure and at a temperature of the boiling point of the solvent to be used or lower. Also, when a heat- and pressure-resistant container such as an autoclave is used, the hydrolysis can be carried out at a temperature even higher than this temperature.

When the hydrolysis is carried out under the above conditions, polycondensation of alkoxysilane proceeds in a three dimensional manner and a dispersion liquid of silica particles having an average particle diameter of 5 to 300 nm is obtained. Also, by adding alkoxysilane again to this dispersion liquid and hydrolyzing it, a dispersion liquid of larger silica particles or silica particles with a uniform particle diameter distribution can be obtained. The silica particles contained in the dispersion liquid may be either spherical with an aspect ratio of 1.00 to 1.20, or irregular with an aspect ratio of greater than 1.20 and 5.00 or less.

Here, when the silica concentration of the dispersion liquid is less than 12% by mass, the dispersion liquid is concentrated such that the silica concentration becomes 12% by mass or more (concentration step). By providing the concentration step multiple times as necessary, a dispersion liquid with a desired concentration can be obtained.

The method of concentration is not particularly limited as long as the method can increase the silica concentration of the dispersion liquid. Examples thereof include a heating concentration method, a vacuum concentration method and a membrane concentration method. Here, when the water replacement step through a heated water replacement method is carried out after the concentration step, it is preferable to use the heating concentration method since the treatment can be carried out continuously. This heating concentration method is a method in which, for example, the dispersion liquid is heated to evaporate the organic solvent and water while adding the dispersion liquid of silica particles, thereby performing concentration.

Next, in the water replacement step (if necessary), the organic solvent contained in the dispersion liquid is replaced with water (pure water). The method is not particularly limited as long as it is a method with which the organic solvent can be replaced with water. Examples thereof include a heating replacement method, a vacuum replacement method and a membrane replacement method. Among them, the heating replacement method is preferable because the aging step can be carried out subsequently to the water replacement step. For example, the dispersion liquid is heated at atmospheric pressure to evaporate the organic solvent while adding water, thereby keeping the liquid volume constant and replacing the organic solvent with water. Note that it is also possible to carry out concentration at the same time without keeping the liquid volume constant. The completion of the water replacement can be confirmed, for example, by the fact that the liquid temperature substantially reaches the boiling point of water (100° C.) when heated at atmospheric pressure. Here, the water replacement step is defined as a step up to the completion of this water replacement. This step can be performed at any appropriate stage after the dispersion liquid preparation step. However, it is preferable to perform the water replacement step between the dispersion liquid preparation step and the aging step. Note that, when alkali not containing metal elements, such as ammonia and amine, is used in this step, the alkali may be discharged out of the system as water is evaporated, and accordingly the pH may be lowered and the viscosity may be raised.

Next, in the aging step, the dispersion liquid is heated in the presence of alkali, thereby aging (compacting) the silica particles. In this step, the silica particles are compacted such that the density of the particles is 1.20 g/cm$^3$ or more. As a result, the density of the silica particles in the dispersion liquid as a final product becomes 1.20 g/cm$^3$ or more. For example, in Examples, the density of particles in the final product is measured, but since the density usually changes only in the aging step, this measured density can be regarded as the density of the particles at the end of the aging step. The aging temperature may be any temperature as long as it can compact the silica articles. For example, under atmospheric pressure, 80° C. or higher is preferable. By aging the particles at such a temperature, siloxane bonds of the silicon atoms in the silica particles can be augmented to increase the density of the particles, thereby improving their compactness and stability. The aging temperature is more preferably 100° C., and it may be a temperature higher than that. However, the upper limit of the temperature is 250° C. because there is a risk that the silica particles are crystallized when the temperature is 300° C. or higher.

For the alkali to be used in the aging step, the catalyst exemplified in the above dispersion liquid preparation step is used. Among them, ammonia is particularly preferable because it allows easy adjustment of the temperature, pH, step time and the like in the system and easy control, and it is also easy to adjust the amount of ammonia remaining in the reaction system. The pH of the dispersion liquid of silica particles in this aging step is preferably 8 or more. By maintaining this pH for a predetermined time (at least 1 hour or longer) and heating the dispersion liquid, compact silica particles can be obtained. The pH during this aging step is more preferably 8.5 or more, and further preferably 9 or more. However, when the pH is 13 or more, there is a risk that silica is dissolved and does not exist as particles. Note that, in the aging step, the alkali may be added separately before the start of or during the treatment, or it may be not added in case the pH has already reached a predetermined value.

The aging step may be carried out in a closed system or in an open system. When the aging step is carried out in a closed system, it can prevent the alkali from being discharged out of the system and allows aging while maintaining the pH in the system. On the other hand, when the aging step is carried out in an open system and when an alkali not containing metal elements, such as ammonia and amine, is used, the alkali is discharged out of the system as the solvent is evaporated by heating. At this time, the alkali may or may not be added in order to maintain the pH. In the latter case, by continuing to heat the dispersion liquid, the alkali component is removed out of the system and the pH is gradually lowered. When this operation is advanced, thereby raising the viscosity of the dispersion liquid and further lowering the pH, the aging step also serves as the alkali removal step, which will be mentioned later.

Next, in the alkali removal step, the alkali is removed from the dispersion liquid after the aging step. Examples of the method for removing alkali include a method in which the alkali is discharged out of the system by heating, and an ion exchange method. For example, as in the above aging step, when alkali not containing metal elements, such as ammonia and amine, is used and heating is continued in an open system without adding a sufficient alkali to maintain the pH, the pH is gradually lowered and the viscosity is gently raised as the alkali is discharged out of the system. Then, when it reaches a certain pH, the viscosity raises drastically. For this reason, conventionally, in order to obtain a dispersion liquid that is easy to handle, the reaction was stopped at a pH higher than the pH as described above, at which the viscosity raises drastically. However, by further lowering the pH below that pH, a Newtonian dispersion liquid with a low viscosity is obtained.

In this alkali removal step, the viscosity of the dispersion liquid is once increased to 60 mPa·s or more. Furthermore, the viscosity is lowered by removing the alkali. The pH of the dispersion liquid at this time shall be less than 8. As such, the dispersion liquid of silica particles whose viscosity has been once raised and then lowered tends to be sufficiently compact and contains little or no incompletely reacted materials, perhaps because the surface of the particles interacts with each other during the process of viscosity change, thereby advancing the compaction, in the step of removing the alkali from the system after carrying out the aging at a higher pH side. The pH of this dispersion liquid of silica particles after the alkali removal is preferably 7.6 or less, more preferably less than 7.4, further preferably less than 7.0, and particularly preferably 6.7 or less. Even when the pH is lowered to 6.0, it would be an excessive treatment because the decrease in the viscosity of the dispersion liquid is small.

It is to be noted that, in order to obtain highly-pure silica particles with a small content of impurity metal elements as mentioned above, it is preferable to make the material of the lining and the like of the apparatus used to prepare the particles free of these elements and with a high chemical resistance (less likely to liquate). Specifically, plastics such as Teflon (registered trademark), FRP and carbon fibers, and non-alkali glass are preferred.

In addition, it is preferable to purify raw materials to be used by distillation, ion exchange, filtration or the like. In particular, the alcohol used in hydrolysis of an alkoxide may be contaminated with metal impurity components from a tank and the like or with a catalyst during synthesis, and may require purification at a particularly high level.

As a method to obtain highly-pure silica particles, there are methods comprising providing raw materials with a small content of impurity components in advance, or preventing contamination from an apparatus for particle preparation, as mentioned above. Alternatively, it is possible to reduce impurity components after obtaining the particles prepared without taking such countermeasures sufficiently. However, in such a method, as impurity components may be incorporated in the silica particles, it would be inefficient to purify using ion exchange or filtration, and there is a risk that a high cost may be required. Thus, it is not practical to obtain silica particles with a small content of impurity components by such a method.

Note that the dispersion liquid of silica particles produced by this production method has the same characteristics as those of the dispersion liquid of silica particles and the silica particles mentioned above.

The dispersion liquid of silica particles can be used as an abrasive by appropriately adding an additive.

The concentration of silica particles in the abrasive is preferably 0.1 to 50% by mass. Here, when the concentration is less than 0.1% by mass, depending on the type of substrate or insulating film, the concentration may be too low, the polishing speed may be slow, and productivity may become a problem. On the other hand, when the concentration of silica particles exceeds 50% by mass, there is a risk that the stability of the abrasive is insufficient. In addition, there is no chance that the polishing speed and the polishing efficiency are further enhanced. Furthermore, in a step of supplying the dispersion liquid for the polishing treatment, a dry matter may be formed and deposited on to the substrate, which may cause occurrence of scratches. The concentration of silica particles in this abrasive is more preferably 5 to 30% by mass.

EXAMPLES

Hereinafter, Examples of the present invention will be described.

Example 1

(Dispersion Liquid Preparation Step)

A raw material solution was prepared by mixing 540.0 g of tetramethoxysilane (manufactured by Tama Chemicals Co., Ltd. (the same applies hereinafter)) and 180.0 g of methanol. In a reaction tank, 5,400 g of a solvent to which methanol, water and ammonia were mixed in advance, was charged. The concentration of water and ammonia in this mixed solvent was 15% by mass and 1% by mass, respectively. While controlling the liquid temperature such that the temperature of the reaction solvent can be maintained at 20° C., the raw material solution was added dropwise to the reaction tank at an even speed over 25 minutes, thereby obtaining a dispersion liquid with a silica concentration of 3.5% by mass. The silica concentration of the dispersion liquid obtained in this manner is shown in Table 1.

(Concentration Step)

Next, this dispersion liquid concentration of 3.5% by mass) was concentrated by a heating concentration method. Specifically, while heating the dispersion liquid at atmospheric pressure to evaporate the organic solvent and water, a dispersion liquid of silica particles (silica concentration of 3.5% by mass) prepared in advance was added such that the liquid volume in the system was kept constant, thereby concentrating the dispersion liquid.

The silica concentration, pH and viscosity of the dispersion liquid at the end of the concentration step are shown in Table 1. Note that the silica concentration of the dispersion liquid ac the time of viscosity measurement was aligned to 20% by mass so that it could be compared with other steps.

(Water Replacement Step)

After the concentration step, while adding water to the dispersion liquid, water replacement was carried out at atmospheric pressure by a heating replacement method. At a time point where the liquid temperature reached 100° C., the water replacement step was stopped.

The silica concentration, pH and viscosity of the dispersion liquid at the end of the water replacement step are shown in Table 1.

(Aging Step and Alkali Removal Step)

After the water replacement step, aqueous ammonia was added to the dispersion liquid to adjust the pH to 9.5. Then, the liquid temperature was kept at 100° C. (heating treatment). During the heating treatment, water was also added such that the silica concentration in the system remained constant. Here, the state with a pH of 9 or more was kept for 2 hours to carry out aging (aging step). After that, heating was continued to remove the alkali (alkali removal step).

Table 1 shows the pH of the dispersion liquid at the start of the aging step, the silica concentration, pH, viscosity and amount of incompletely reacted materials of the dispersion liquid at the end of the alkali removal step, and the specific surface area, density, average particle diameter, carbon content, $NH_3$ content and particle shape of the silica particles.

For the dispersion liquid of silica particles and the silica particles obtained in this manner, various parameters were measured by the following methods.

<<Measurement of Silica Concentration>>

5 g of the sample was dried at 150° C. for 1 hour, and the silica concentration was calculated from the mass after drying.

<<Viscosity of Dispersion Liquid>>

Measurement was conducted using a rheometer (RS3000 manufactured by HAAKE) under conditions with a temperature of 25° C. and a shear rate of 100 $s^{-1}$. Note that the viscosity in terms of a silica concentration of 20% by mass refers to a viscosity measured by, without changing the pH of the dispersion liquid with a certain silica concentration, adjusting its silica concentration to 20% by mass.

<<Amounts of Metal Elements in Dispersion Liquid>>

For the amounts of alkali metals, alkali earth metals, each element of Fe, Ti, Zn, Pd, Ag, Mn, Co, Mo, Sn, Al and Zr, each element of Cu, Ni and Cr, and each element of U and Th in the dispersion liquid, silica particles were dissolved in hydrofluoric acid, the resultant solution was heated to remove hydrofluoric acid, pure water was then added as necessary, and the obtained solution was measured by using an ICP-MS inductively coupled plasma mass spectrometer (7900s manufactured by Agilent Technologies), thereby determining the amounts as a value per silica particle.

<<Presence or Absence of Alkoxy Groups of Silica Particles>>

The dispersion liquid was dried at 150° C., and measurement was conducted using a Fourier transform infrared spectrometer (FT/IR-6100 manufactured by JASCO Corporation) to determine the presence or absence of alkoxy group (—OR).

<<Carbon Content of Silica Particles>>

For the carbon content of the silica particles, the dispersion liquid was dried at 150° C. and the measurement was conducted using a carbon sulfur analyzer (EMIA-320V manufactured by HORIBA, Ltd.).

<<Amount of Ammonia in Dispersion Liquid>>

Aqueous 20% by mass NaOH solution was added to the dispersion liquid and the resultant solution was distilled while dissolving the silica particles. By collecting the evaporated ammonia with 0.05 mol/L sulfuric acid and titrating with 0.1N NaOH, the amount of sulfuric acid consumed was determined, and the total amount of ammonia in the solution was determined.

<<Amount of Incompletely Reacted Materials in Dispersion Liquid>>

Using a micro ultracentrifuge (CS150GXL manufactured by Hitachi Koki Co., Ltd.), the dispersion liquid was centrifuged at 1,370,000 rpm (1,000,000 G) for 30 minutes at a set temperature of 10° C. "Compounds containing silicon" (incompletely reacted materials) other than the silica particles present in the supernatant of this treated solution were measured as Si with an ICP emission spectrometer (ICPS-8100 manufactured by Shimadzu Corporation). This measured value was converted into the concentration of $SiO_2$ in the dispersion liquid.

<<Aspect Ratio of Silica Particles>>

With reference to FIGS. 1(A) to (D), a method for calculating the aspect ratio of silica particles will be described. FIG. 1(A) illustrates a single particle observed with a scanning electron microscope, and represents a state surrounded by a rectangle that is in contact with the particle. FIGS. 1(B) to (D) schematically illustrate a group of particles that are joined, and represent a state in which the group of particles is surrounded by a rectangle so that the area is minimum. As shown in the FIGURE, the long side is defined as b and the short side is defined as a. The ratio between the short side a and the long side b (b/a; provided that b≥a) was determined for 100 (groups of) particles, and the average value thereof was defined as the aspect ratio. Here, each solid black area represents a junction part between the particles and each junction part may include a space.

The viscosity and the compaction degree in Table 1 were evaluated according to the following criteria.

<<Evaluation for Viscosity>>
Excellent: 30 mPa·s or less
Good: greater than 30 mPa·s and 40 mPa·s or less
Poor: greater than 40 mPa·s <<Evaluation for Compaction Degree>>
Excellent: 1.40 g/cm³ or more
Good: 1.20 g/cm³ or more and less than 1.40 g/cm³
Poor: less than 1.20 g/cm³

<<Abrasive (Polishing Composition)>>

An abrasive containing 3.0% by mass of the dispersion liquid of silica particles produced in Example 1 as the silica particle, 175 ppm of hydroxyethyl cellulose (HEC) and 225 ppm of ammonia was prepared. The results of the following performance evaluation of the abrasive are shown in Table 1.

<Performance Evaluation of Abrasive>
<<Stability Test of Abrasive>>

The stability of the abrasive was evaluated by the presence or absence of white turbidity after the abrasive was sealed in a container and stored at 25° C. for 6 months.
Good: white turbidity absent
Poor: white turbidity present 1. Polishing Speed A substrate for polishing (a single crystal silicon wafer having a crystal structure of 1.0.0) was used and set in a polishing machine (NF300 manufactured by Nano Factor Co., Ltd.), and the substrate for polishing was polished for 5 minutes by use of a polishing pad Politex P103 with a polishing load of 0.05 MPa at a table rotation speed of 50 rpm, and a spindle speed of 50 rpm with the abrasive at a speed of 100 ml/min. Thereafter, the substrate was washed with pure water and air-dried.

<<Evaluation for Polishing Speed>>
Good: polishing speed of greater than 25 nm/min
Fair: polishing speed of 20 to 25 nm/min
Poor: polishing speed of less than 20 nm/min 2. State of Polished Surface The obtained polished surface of the polished substrate was observed using a scanning white light interferometer (Zygo New View 7300), and the smoothness of the surface was evaluated in accordance with the following criteria (waviness).

<<Evaluation for Smoothness>>
Good: waviness of less than 0.5 nm
Fair: waviness of 0.5 nm or more and less than 1.0 nm.
Poor: waviness of 1.0 nm or more By using a laser microscope (VK-X250 manufactured by KEYENCE CORPORATION), the degree and area of defects such as scratches were confirmed, thereby evaluating the defects occurring on the polished substrate in accordance with the following criteria.

<<Evaluation for Defects>>
Good: almost no defects observed
Fair: a few defects observed
Poor: defects observed over a wide area The "remaining" particles (silica component) on the polished substrate were evaluated in accordance with the following criteria by counting the number of particles using a laser microscope (VK-X250 manufactured by Keyence Corporation).
Excellent: 0 "remaining" particle
Good: 1 to 10 "remaining" particles
Fair: 11 to 50 "remaining" particles
Poor: 51 to 100 "remaining" particles
Bad: 101 or more "remaining" particles In the following Examples and Comparative Examples as well, each characteristic was evaluated in the same manner as Example 1.

Example 2 to Example 3

Up to the aging step, the same operations were conducted as in Example 1, and the heating time in the alkali removal step was changed. The alkali removal step was carried out with a heating time of 0.7-fold in Example 2 and 0.4-fold in Example 3, based on the heating time of Example 1.

Example 4

In the aging step, aqueous ammonia was added to the dispersion liquid that had been subjected to the water replacement, thereby adjusting the pH to 8, and the dispersion liquid was aged while keeping the state with a pH of 8 for 2 hours. Other than this, a dispersion liquid of silica particles was produced in the same manner as Example 1.

Example 5

(Dispersion Liquid Preparation Step)

410.0 g of methanol (bedding solution) was maintained at 40° C., and to this bedding solution, 3436.3 g of a methanol solution (liquid A) formed by mixing 976.3 g of tetramethoxysilane and 2460 g of methanol, and 1684.0 g of 3.9% by mass aqueous ammonia (liquid B) were added at the same time over 10 hours. After completion of the addition, the mixture was further aged at the same temperature for 3 hours, thereby obtaining a dispersion liquid with a silica concentration of 7% by mass.

The variation rate of the mole ratio of the alkali catalyst to the silane alkoxide in the reaction system (alkali catalyst/silane alkoxide) during a period from the start to the end of the addition of the liquid A and the liquid B relative to the initial mole ratio was 1.0, and the variation rate of the mole ratio of water to the silane alkoxide in the reaction system (water/silane alkoxide) during a period from the start to the end of the addition of the liquid A and the liquid B relative to the initial mole ratio was 1.0.

Note that each of the mole ratios of alkali catalyst/silane alkoxide and water/silane alkoxide was calculated based on the measured addition weights, assuming that the hydrolysis and polycondensation reactions of the silane alkoxide take place instantaneously and that the alkali catalyst is not released out of the system. Each of mole ratios in the reaction system was calculated from 10 minutes after the start of the addition of the liquid A and the liquid B and every 10 minutes thereafter. The changes of the mole ratios of each substance in the reaction system were compared by using the numerical values obtained by dividing the mole ratios by the mole ratios (theoretical values) immediately after the addition of the liquid A and the liquid B as the initial values.

$$Si(OR)_4 + 4H_2O \rightarrow Si(OH)_4 + 4ROH$$

(4 mol consumed during hydrolysis)

$$Si(OH)_4 \rightarrow SiO_2 + 2H_2O$$

(2 mol released during polycondensation)
(Aging Step to Alkali Removal Step)

From the concentration step and after, the same treatments were conducted as in Example 1, thereby obtaining a dispersion liquid of silica particles with a concentration of 20% by mass.

Example 6

Up to the dispersion liquid preparation step, the same operations were conducted as in Example 1, followed by concentration and water replacement using an ultrafiltration membrane. After the water replacement step was completed, the heating treatment was carried out as is while maintaining 80° C. The same amount of water as the amount of liquid to be distilled in this step was added, and the heating was continued while keeping the silica concentration in the system constant. Note that the state with a pH of 9 or more was kept for 1 hour to carry out aging (aging step). After the aging step was completed, the alkali was removed using an ion exchange resin (alkali removal step). Finally, by carrying out concentration under reduced pressure with a rotary evaporator (concentration step), a dispersion liquid of silica particles with a concentration of 20% by mass was obtained.

Example 7

In the same manner as Example 6 except that the liquid temperature was set to 100° C. and the heating time was set to 2 hours in the aging step, a dispersion liquid of silica particles with a concentration of 20% by mass was obtained.

Example 8

In the aging step, aqueous ammonia was added to the dispersion liquid that had been subjected to the water replacement, thereby adjusting the pH to 8, and the dispersion liquid was aged while keeping the state with a pH of 8 at 80° C. for 1 hour. Other than this, a dispersion liquid of silica particles was produced in the same manner as Example 1.

Example 9

In the aging step, aqueous ammonia was added to the dispersion liquid that had been subjected to the water replacement, thereby adjusting the pH to 9, and the dispersion liquid was then placed in an autoclave and aged at 150° C. for 10 hours. Other than this, dispersion liquid of silica particles was produced in the same manner as Example 1.

Example 10

In the aging step, aqueous ammonia was added to the dispersion liquid that had been subjected to the water replacement, thereby adjusting the pH to 9, and the dispersion liquid was then placed in an autoclave and aged at 200° C. for 10 hours. Other than this, a dispersion liquid of silica particles was produced in the same manner as Example 1.

Example 11

A raw material solution was prepared by mixing 540.0 g of tetramethoxysilane and 180.0 g of methanol. In a reaction tank, 3565.7 g of a solvent to which methanol, water and ammonia were mixed in advance, was charged. The concentration of water and ammonia in this mixed solvent was 19% by mass and 1.5% by mass, respectively. While controlling the liquid temperature such that the temperature of the reaction solvent can be maintained at 20° C., the raw material solution was added dropwise to the reaction tank at an even speed over 25 minutes, thereby obtaining a dispersion liquid of silica particles with a silica concentration of 5.0% by mass.

Note that, in any of the Examples, in the dispersion liquids of silica particles, the amounts of alkali metals, alkali earth metals, each element of Fe, Ti, Zn, Pd, Ag, Mn, Co, Mo, Sn, Al and Zr were each less than 0.1 ppm per silica particle; the amount of each element of Cu, Ni, Cr was less than 1 ppb per silica particle; and the amount of each element of U and Th was less than 0.3 ppb per silica particle.

Comparative Example 1

Up to the water replacement step, the same operations were conducted as in Example 1, thereby obtaining a water replaced-dispersion liquid. Aqueous ammonia was added to that liquid, thereby adjusting the pH to 8.5, and the liquid was then subjected to the heating treatment while keeping the liquid temperature at 100° C. The same amount of water as the amount of liquid to be distilled in this step was added as well, and the heating was continued while keeping the silica concentration in the system constant. Note that the state with a pH of 8 or more was kept for 2 hours to carry out aging (aging step). After that, no alkali removal step was carried out.

Comparative Example 2

Up to the concentration step, the same operations were conducted as in Example 1, thereby obtaining a concentrated dispersion liquid. While adding water to that liquid, water replacement was carried out at atmospheric pressure by the heating replacement method. The same amount of water as the amount of liquid to be distilled was added, and the heating was continued while keeping the silica concentration in the system constant. At a time point where the liquid temperature reached 100° C., the water replacement step was stopped.

After that, neither aging step nor alkali removal step was carried out, and finally, the liquid was heated and concentrated, thereby obtaining a dispersion liquid of silica particles with a concentration of 20% by mass.

Comparative Example 3

Up to the water replacement step, the same operations were conducted as in Example 6, and after that, neither aging step nor alkali removal step was carried out, and finally, the liquid was only subjected to concentration under reduced pressure, thereby obtaining a dispersion liquid of silica particles with a concentration of 20% by mass.

Note that, in any of the Comparative Examples, in the dispersion liquids of silica particles, the amounts of alkali metals, alkali earth metals, each element of Fe, Ti, Zn, Pd, Ag, Mn, Co, Mo, Sn, Al and Zr were each less than 0.1 ppm per silica particle; the amount of each element of Cu, Ni, Cr was less than 1 ppb per silica particle; and the amount of each element of U and Th was less than 0.3 ppb, per silica particle.

TABLE 1

|  |  |  | Example 1 | Example 2 | Example 3 | Example 4 | Example 5 | Example 6 | Example 7 | Example 8 |
|---|---|---|---|---|---|---|---|---|---|---|
| dispersion liquid preparation step | silica concentration | mass % | 3.5 | same as example 1 |  |  | 7 | 3.5 | same as example 6 | same as example 1 |
| concentration step | silica concentration | mass % | 15 |  |  |  |  | 12 |  |  |
|  | pH | — | 9.8 |  |  |  |  | 10.5 |  |  |
|  | viscosity in terms of a silica concentration of 20% by mass @ 100 s − 1 | mPa · s | 15 |  |  |  |  | 15 |  |  |
| water replacement step | silica concentration | mass % | 20 |  |  |  |  | 17 |  |  |
|  | pH | — | 7.8 |  |  |  |  | 9.5 |  |  |
|  | viscosity in terms of a silica concentration of 20% by mass @ 100 s − 1 | mPa · s | 70 |  |  |  |  | 15 |  |  |
| aging step | pH | — | 9.5 | 9.5 | 9.3 | 8 | 9.5 | 9.5 | 9.5 | 8 |
|  | performed | Yes/None | Yes | Yes | Yes | Yes | Yes | Yes | Yes | Yes |
|  | heating condition | ° C./hrs. | 100/2 | 100/2 | 100/2 | 100/2 | 100/2 | 80/1 | 100/2 | 80/1 |
| alkali removal step | performed | Yes/None | Yes | Yes | Yes | Yes | Yes | Yes | Yes | Yes |
| concentration step | performed | Yes/None | None | None | None | None | None | Yes | Yes | None |
| dispersion liquid of silica | silica concentration | mass % | 20 | 20 | 20 | 20 | 20 | 20 | 20 | 20 |
|  | pH | — | 6.7 | 6.9 | 7.5 | 6.7 | 6.7 | 7 | 7 | 6.7 |
|  | viscosity @ 100 s − 1 | mPa · s | 18 | 25 | 39 | 18 | 18 | 32 | 27 | 22 |
|  | evaluation for viscosity | — | excellent | excellent | good | excellent | excellent | good | excellent | excellent |
|  | evaluation for compaction degree | — | excellent | excellent | excellent | excellent | excellent | good | good | good |
|  | amount of incompletely reacted materials | ppm | 150 | 150 | 150 | 170 | 140 | 200 | 190 | 180 |
|  | specific surface area | m²/g | 73 | 73 | 73 | 77 | 73 | 93 | 87 | 82 |
|  | density | g/cm³ | 1.49 | 1.49 | 1.49 | 1.42 | 1.49 | 1.2 | 1.26 | 1.33 |
|  | average particle diameter | nm | 55 | 55 | 55 | 55 | 55 | 55 | 55 | 55 |
|  | carbon content | mass % | 0.05 | 0.05 | 0.05 | 0.07 | 0.05 | 0.48 | 0.2 | 0.1 |
|  | NH3 content | ppm | 20 | 20 | 20 | 20 | 20 | 90 | 85 | 40 |
|  | particle shape | — | irregular | irregular | irregular | irregular | irregular | irregular | irregular | irregular |
| polishing composition | stability | — | good | good | good | good | good | good | good | good |
| polishing characteristics | polishing speed | — | good | good | good | good | good | fair | fair | fair |
|  | area (smoothness) | — | good | good | good | good | good | good | good | good |
|  | defects | — | good | good | good | good | good | good | good | good |
|  | remaining | — | excellent | excellent | excellent | good | excellent | good | good | good |

TABLE 1-continued

|  |  |  | Example 9 | Example 10 | Example 11 | Comparative Example 1 | Comparative Example 2 | Comparative Example 3 |
|---|---|---|---|---|---|---|---|---|
| dispersion liquid preparation step | silica concentration | mass % | same as example 1 |  | 5 | same as example 1 | same as example 1 | same as example 6 |
| concentration step | silica concentration | mass % |  |  | 15 |  |  |  |
|  | pH | — |  |  | 9.8 |  |  |  |
|  | viscosity in terms of a silica concentration of 20% by mass @ 100 s − 1 | mPa · s |  |  | 15 |  |  |  |
| water replacement step | silica concentration | mass % |  |  | 20 |  | 15 |  |
|  | pH | — |  |  | 7.8 |  | 8.2 |  |
|  | viscosity in terms of a silica concentration of 20% by mass @ 100 s − 1 | mPa · s |  |  | 70 |  | 74 |  |
| aging step | pH | — | 9 | 9 | 9.5 | 8.5 | — | — |
|  | performed | Yes/None | Yes | Yes | Yes | Yes | None | None |
|  | heating condition | ° C./hrs. | 150/10 | 200/10 | 100/2 | 100/2 | — | — |
| alkali removal step | performed | Yes/None | Yes | Yes | Yes | None | None | None |
| concentration step | performed | Yes/None | None | None | None | None | Yes | Yes |
| dispersion liquid of silica | silica concentration | mass % | 20 | 20 | 20 | 20 | 20 | 20 |
|  | pH | — | 6.5 | 6.3 | 6.7 | 8 | 7.8 | 8.9 |
|  | viscosity @ 100 s − 1 | mPa · s | 17 | 15 | 15 | 75 | 70 | 45 |
|  | evaluation for viscosity | — | excellent | excellent | excellent | poor | poor | poor |
|  | evaluation for compaction degree | — | excellent | excellent | excellent | excellent | poor | poor |
|  | amount of incompletely reacted materials | ppm | 130 | 120 | 150 | 160 | 350 | 220 |
|  | specific surface area | m²/g | 71 | 69 | 58 | 75 | 90 | 95 |
|  | density | g/cm³ | 1.53 | 1.58 | 1.49 | 1.45 | 1.15 | 1.1 |
|  | average particle diameter | nm | 55 | 55 | 46 | 55 | 58 | 55 |
|  | carbon content | mass % | 0.02 | 0.005 | 0.05 | 0.06 | 0.1 | 0.5 |
|  | NH3 content | ppm | <20 | <20 | 20 | 80 | 90 | 900 |
|  | particle shape | — | irregular | irregular | spherical | irregular | irregular | irregular |
| polishing composition | stability | — | good | good | good | poor | poor | poor |
| polishing characteristics | polishing speed | — | guild | good | good | good | poor | poor |
|  | area (smoothness) | — | fair | fair | good | fair | fair | fair |
|  | defects | — | fair | fair | good | fair | fair | fair |
|  | remaining | — | excellent | excellent | excellent | good | bad | bad |

As shown in Table 1, it can be seen that in Comparative Examples 1 to 3, in which alkali removal in the alkali removal step was not carried out, the viscosity is high whereas in Examples 1 to 11 the viscosity is low. It can be also seen that in Examples 1 to 11 the density is high and sufficient compaction of silica particles is achieved. In other words, each of the dispersion liquids of silica particles produced in the present Examples is a Newtonian dispersion liquid with a low viscosity (1) containing compacted highly-pure silica particles (2) in a high concentration and (3) having the particles unaggregated.

The invention claimed is:
1. A dispersion liquid of silica particles, comprising silica particles having an average particle diameter of 5 to 300 nm determined from an electron micrograph, and a density of 1.20 g/cm³ or more and less than 1.60 g/cm³ determined from the average particle diameter and a specific surface area determined by a BET method using nitrogen adsorp- tion, and an amount of carbon derived from an alkoxy group contained in the silica particles is 0.005% by mass or more and 0.50% by mass or less, wherein the dispersion liquid has a pH of less than 8, a silica concentration of 12 to 40% by mass, and a viscosity in terms of a silica concentration of 20% by mass of 40 mPa·s or less, wherein an amount of a compound containing silicon other than the silica particles in the dispersion liquid is 200 ppm or less, wherein a peak area showing Q4 structure, determined by $^{29}$Si-NMR analysis from −100.0 to −120.0 ppm, is 70% to 90% of a peak area showing Q0 to Q4 structure, determined by $^{29}$Si-NMR analysis from −73.0 to −120.0 ppm.

2. The dispersion liquid of silica particles according to claim 1, wherein amounts of the following elements in the dispersion liquid are, per said silica particle, as follows:
   (1) an amount of each of alkali metals, alkali earth metals, Fe, Ti, Zn, Pd, Ag, Mn, Co, Mo, Sn, Al and Zr is less than 0.1 ppm;
   (2) an amount of each of Cu, Ni and Cr is less than 1 ppb; and
   (3) an amount of each of U and Th is less than 0.3 ppb.

3. The dispersion liquid of silica particles according to claim 1, wherein the dispersion liquid comprises ammonia, and a content of ammonia at a silica concentration of 20% by mass is less than 100 ppm.

4. A method for producing a dispersion liquid of silica particles, comprising: preparing a dispersion liquid containing silica particles by using alkoxysilane as raw material; aging by heating the dispersion liquid in the presence of alkali such that a density of the silica particles determined from an average particle diameter determined from an electron micrograph and a specific surface area determined by a BET method using nitrogen adsorption is 1.20 g/cm$^3$ or more 1.60 g/cm$^3$ or less, and removing the alkali from the dispersion liquid obtained by aging to once raise a viscosity in terms of a silica concentration of 20% by mass of the dispersion liquid to 60 mPa·s or more and then further removing the alkali to provide a pH of the dispersion liquid of less than 8, wherein an amount of carbon derived from an alkoxy group contained in the silica particles is 0.005% by mass or more and 0.50% by mass or less, an amount of a compound containing silicon other than the silica particles in the dispersion liquid is 200 ppm or less, wherein a peak area showing Q4 structure, determined by $^{29}$Si-NMR analysis from −100.0 to −120.0 ppm, is 70% to 90% of a peak area showing Q0 to Q4 structure, determined by $^{29}$Si-NMR analysis from −73.0 to −120.0 ppm.

5. The method for producing a dispersion liquid of silica particles according to claim 4, comprising replacing an organic solvent of the dispersion liquid with water, after preparing the dispersion liquid and before aging the dispersion liquid.

6. The method for producing a dispersion liquid of silica particles according to claim 4, wherein the aging is carried out at a pH of 8 or more.

* * * * *